May 25, 1965 HANS-DIETER SCHNEIDER 3,185,888

SCANNING TRANSISTOR CIRCUIT

Filed Nov. 14, 1961 3 Sheets-Sheet 1

Inventor:
Hans-Dieter Schneider
by Richard S. Striker
Attorney

*Inventor:*
Hans-Dieter Schneider
by
Michael S. Striker
Attorney

May 25, 1965 HANS-DIETER SCHNEIDER 3,185,888

SCANNING TRANSISTOR CIRCUIT

Filed Nov. 14, 1961 3 Sheets-Sheet 3

Jnventor:
Hans Dieter Schneider
by Michael S. Striker
Attorney

United States Patent Office 3,185,888
Patented May 25, 1965

3,185,888

SCANNING TRANSISTOR CIRCUIT

Hans-Dieter Schneider, Gross-Gerau, Germany, assignor to Fernseh G.m.b.H., Darmstadt, Germany Filed Nov. 14, 1961, Ser. No. 152,187
Claims priority, application Germany, Nov. 16, 1960, F 32,558
16 Claims. (Cl. 315—27)

The invention relates to a sawtooth voltage generator arrangement, and more particularly to a transistor scan generator of the amplifier type, i.e. a generator, in which the output voltage necessary to produce a scanning current for feeding the deflection coils of the cathode ray tube is generated in preliminary form in a primary generator synchronized by impulses from any impulse source and is formed and amplified in one or more subsequent amplifier stages to a final form having the necessary amplitude and wave form of the output voltage. The invention also concerns a method of processing the signal of the primary generator for compensating distortions resulting from the output stage and the deflection circuit.

The main object of the present invention therefore is to provide simple and stable transistor scan generator and method by which the harmonic oscillations appearing in the output stage during the trace stroke are adequately damped, while the flyback or retrace on the contrary is undamped.

It is another object of the present invention to provide a novel circuit arrangement for linearisation of the deflection current delivered by a transistor scan generator.

Still another object of the present invention is to provide a novel transistor circuit arrangement and method for shortening the flyback period of the scanning voltage so that the interval between the end of the flyback time and the commencement of the picture content may be used for precorrection of tangential errors and the like.

It is a further object of the invention to provide an improved sawtooth generator arrangement furnishing a sawtooth voltage having an improved wave form particularly regarding the duration of the descending slope period thereof.

Other objects and advantages of the invention will become apparent in the following description.

The problem of generating a deflection current of sawtooth waveform and of medium power for television tubes, especially television pickup tubes, by means of transistors instead of with amplifier valves has already been approached from various angles, without a satisfactory solution having up to now been found.

It has been found that valve circuit techniques for scan generators, which are now relatively well established, cannot be applied directly to transistor operation, more particularly as regards the question of aperiodic damping of the deflector coil circuit and the associated problem of spurious oscillations. It is known that in scan generators there exist the requirements, on the one hand, that the coil circuit shall be as nearly as possible aperiodically damped, so that no harmonic oscillations shall arise in the deflection current and thus become visible in the picture, and on the other hand, that during the flyback periods the deflector coil circuit shall oscillate as nearly as possible completely undamped, in order that the oscillatory energy can be brought rapidly into the opposite phase. These mutually conflicting conditions can be brought into agreement with one another only with great difficulty in the transistor circuits known today.

It has already been attempted to overcome this difficulty by generating the impulse component of the coil current which is present during the flyback periods in a separate transistor circuit and adding it to the individually produced sawtooth component of current which is present during the trace stroke. However, while it is thus possible to suppress the harmonic components to a sufficient extent, the resulting circuit requires a considerable expenditure on transistors, transformers and diodes, which in many applications is prohibitive.

In accordance with the present invention there is provided in a television system including a beam deflector system, in combination, a sawtooth voltage generator; at least one preamplifier means for amplifying the output of said sawtooth voltage generator; output amplifier means arranged to be supplied with the amplified voltage derived from said preamplifier means and adapted to deliver a modified sawtooth control voltage having in every wave an ascending slope and a descending slope to the beam deflector system; and means for applying a feedback voltage from said output amplifier means and said preamplifier means only during said descending slope period so as to effect during said period an increase of the internal resistance of said output amplifier means, whereby the duration of said descending slope period in said modified sawtooth voltage is reduced.

It is in fact already known to employ negative feedback in transistor circuits to linearize the sawtooth current in the preceding stages: the known arrangements, however, are not suitable to effect the matching of the resistance of the output stage with the present requirement of damping the deflection current. In valve circuits the reason for the present invention does not exist, since with thermionic valves it is no problem to make the internal resistance as high as required by arranging matters so that the valve is cut off during the flyback or retrace.

In a preferred embodiment of the present invention there is provided between the emitter resistance of the output stage operating in the common-emitter configuration and the input circuit of a preceding amplifier stage a positive feedback channel which is made inoperative during the flyback periods, preferably by interrupting it.

In an embodiment of the invention two resistors, the values of which are high compared with the effective resistances of the common electrodes of the output stage and of a preceding stage, between which they are connected in series, have connected to their junction a clamp circuit which is arranged to connect during the flyback periods this junction to a point of substantially constant potential. In addition the feedback may be applied to the preceding stage across a negative-feedback resistor connected in the lead to the common electrode, this resistor having in parallel with it a capacitor with such a value that the brief impulses passing through the positive-feedback circuit during the flyback intervals are considerably reduced in effect and preferably are made substantially inoperative.

An improved embodiment of the invention includes also a negative feedback circuit encompassing the positive-feedback circuit, which negative-feedback circuit is arranged to compensate for distortion which may result from the use of positive feedback. The amount of positive feedback can in this case be made correspondingly greater.

The novel features which are considered as characteristic for the invention are set forth in particular in the appended claims. The invention itself, however, both as to its construction and its method of operation, together with additional objects and advantages thereof, will be best understood from the following descritpion of specific embodiments when read in connection with the accompanying drawings, in which:

Figure 3:
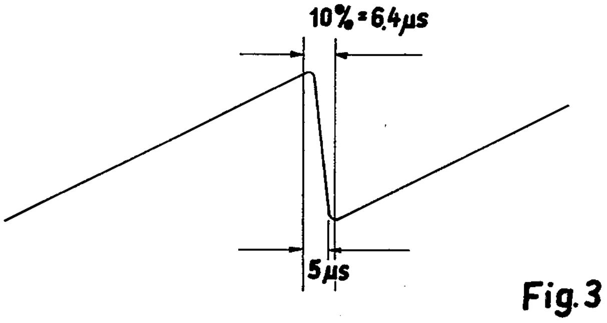
Figure 4:
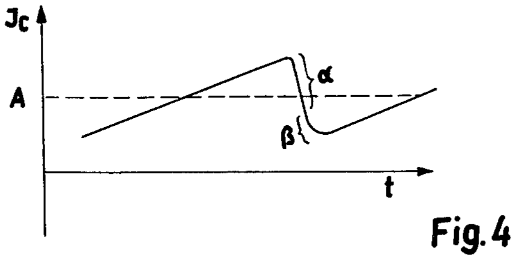
Figure 5:
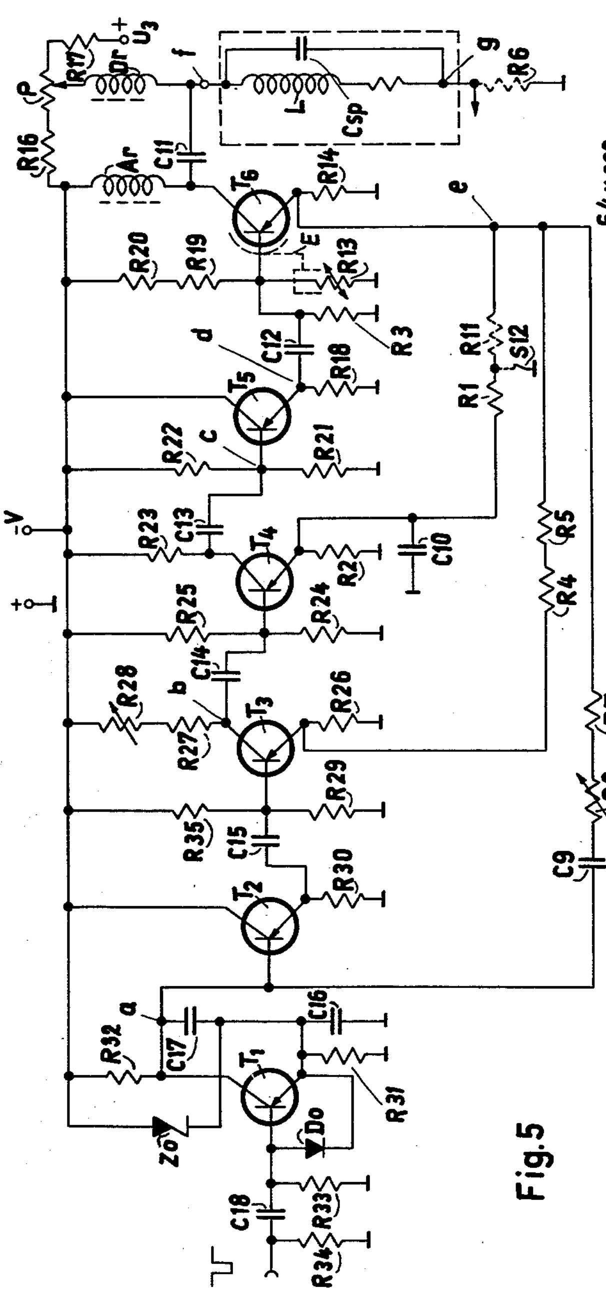
Figure 6:
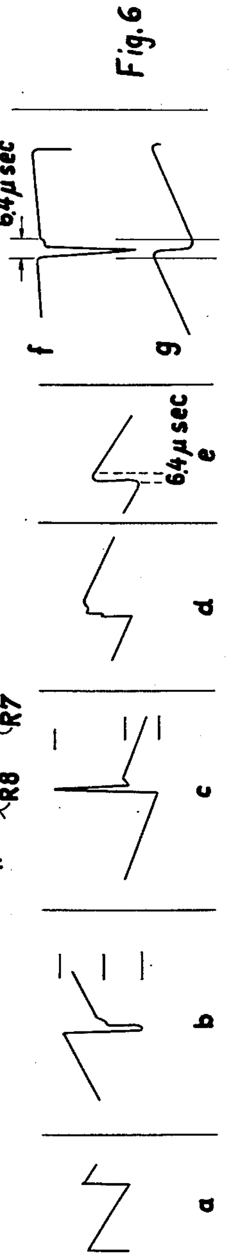
Figure 7:
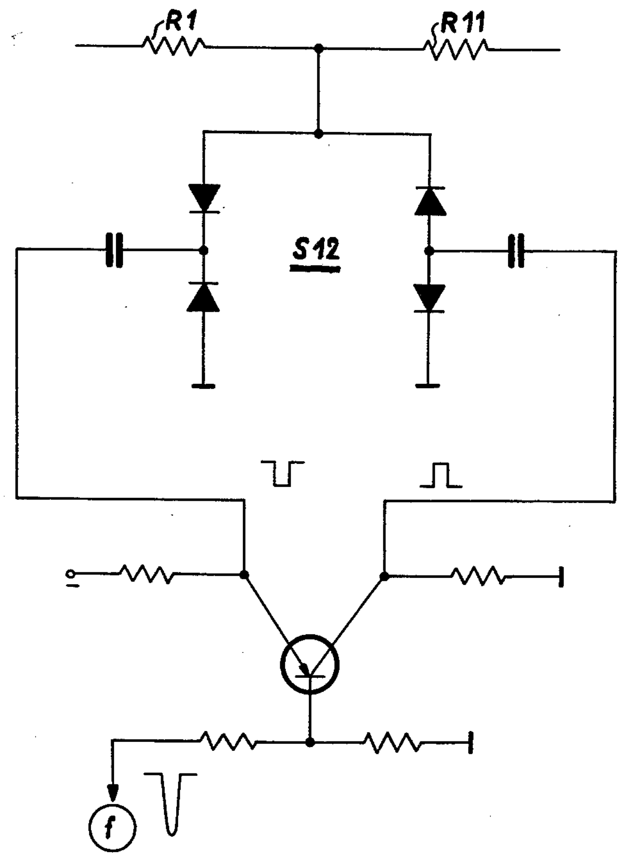

FIG. 3 shows the desired variation with time of the current in the deflector coils, FIG. 4 illustrates the deflection-coil current with special reference to the conditions during the flyback period, FIG. 5 is a more detailed illustration of the circuit of a preferred embodiment of a scan generator according to the invention, FIG. 6 shows oscillograms *a* to *g* for illustrating the operating conditions at certain points *a* to *g* in the circuit of FIG. 5, indicated by a corresponding reference letter surrounded by a circle in FIG. 5, and FIG. 7 is a partial circuit diagram showing a modified detail of FIG. 5.

Figure 1:
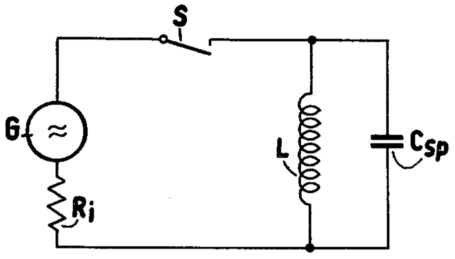
FIG. 1 shows the basic circuit diagram of a deflection circuit.

In the description which follows there will first of all be discussed the principle of operation generally employed for television camera deflection circuits employing thermionic valves. The basic circuit of such a scan generator is shown in FIG. 1. Here G is a sawtooth generator having an internal resistance $R_i$ (shown separately), L is the effective inductance of the deflector coils and $C_{sp}$ in their self capacitance. The generator may be most simply considered as being the output stage of a scan generator, operating as a normal Class-A amplifier and therefore possessing a definite internal resistance $R_i$. However, the circuit possesses the peculiarity that during the trace stroke the generator G is connected to the deflector coils by way of a switch S, which may for example be an appropriately poled diode, and during the flyback period it is disconnected from the coils. The magnetic field built up by the current flowing from the generator during the trace stroke collapses during the flyback, when the stored energy is converted from $$L\frac{I^2}{2} \text{ into } C\frac{U^2}{2}$$

In other words the current charges the parallel capacitance $C_{sp}$ to a voltage which is the higher the smaller is the value of the capacitance. During the flyback period the stored energy performs a damped oscillation of the frequency $$f=\frac{1}{2\pi}\sqrt{\frac{1}{L.C_{sp}}} \quad (1)$$

Figure 2:
FIG. 2 shows the form of an oscillation which may arise in such a circuit.

(see FIG. 2). This damped oscillation $U_{sp}$ decays according to an exponential function. The amplitude of the voltage appearing across $C_{sp}$ then varies in accordance with the circuit constants, thus:

$$U_{sp}=U_0 \cdot e^{\frac{-R_i}{2L}t} \quad (2)$$

If now $R_i$ becomes very small during the period of the trace stroke, the oscillations are suddenly interrupted; that is, by altering the value of the damping resistance $R_i$ the system may be changed from the periodic to the aperiodic state. It is thus possible to produce the most advantageous conditions both for the trace stroke and for the flyback by varying the internal resistance of the generator.

When it is desired to obtain these relations in scan generators using transistors, various difficulties are encountered. In the first place the use of transformers in the deflection current circuit must be avoided because of possible distortion and increased expense, and, in addition, the usual diode switch cannot be employed. In the second place the peak voltages appearing during the flyback are difficult to control, since they should not become greater than the permissible collector voltage.

One way of overcoming these difficulties would be to use a class-A amplifier stage which operates with a constant internal resistance as the damping resistance for the deflection circuit. When the deflection power is small, for example in camera scan generators, the energy to be damped out or dissipated during the flyback time is relatively small so that this arrangement is possible, although energy recovery must then be ruled out. The resistance of the generator must be so chosen that no transient phenomena can result during the trace stroke, that is for a given number of ampere-turns the deflection coils must possess a very small, practically negligible inductance. This cannot, however, be realized in practice. The number of turns, the wire diameter and the current in the coil can be chosen only in a definite particular relation to one another.

If a line deflection frequency of 15,625 c./s. is assumed, corresponding to the European standard of 625 lines, then the time available for the flyback amounts to approximately 5 $\mu$s. (see FIG. 3). Since the damping resistance must fulfill the condition $T=L/R_i$, there results the following:

$$5=L/R_i \quad (3)$$

where L is expressed in microhenries, R in ohms and T in microseconds, whence:

$$L=5.R_i \quad (4)$$

This means that for a given inductance of the coil the internal resistance of the generator must not be less than a corresponding minimum value. The value realizable during the flyback is not in itself adequate for complete damping of the transient phenomena during the trace stroke. If a value for L of 400 $\mu$h. is inserted in Equation 3, then $R_i$ must have a value not less than 80 ohms.

So-called aperiodic circuits are already known, these however deal only with very small deflection powers. In such circuits the linearity, that is the aperiodic condition, is toward the beginning of the line scan period very strongly dependent upon the working point A of the collector current $I_c$ of the output stage, for these former circuits make use of the differential output resistance in order to obtain the changes in damping resistance. This output resistance is furthermore dependent upon all of the operating conditions of the transistor.

By appropriate choice of the working point A (see FIG. 4) the peaks of the flyback current may be brought very near to $I_c=0$ (region $\alpha$ in FIG. 4), so that at the beginning of the line stroke the internal resistance is at its least and the damping therefore at a maximum. In the remaining operating range the internal resistance is greater and the damping is therefore less. Thus the variation of the internal resistance produces different damping effects upon the coils.

A mode of operation in which the linearization of the scan at the beginning of the lines is effected by the variation of the internal resistance of the generator in accordance with amplitude of the output signal cannot be recommended for reasons of lack of reliability in operation. There exists however a good possibility of making the internal resistance of the generator different during the trace and flyback strokes, respectively, and in accordance with the invention this may be effected by means of positive and negative feedback. A complete circuit diagram of one embodiment of this form of the invention is shown in FIG. 5. This circuit comprises six transistors $T_1$ to $T_6$, of which transistor $T_1$ is driven by a negative rectangular impulse and generates an approximately linear sawtooth voltage wave. This sawtooth wave passes through a buffer transistor $T_2$ to a preamplifier stage $T_3$ and from this to a driver amplifier stage $T_4$. The output of driver stage $T_4$ passes by way of a further buffer transistor $T_5$ to the output stage transistor $T_6$. In the collector circuit of transistor $T_6$ is connected the deflection coil L with its shunt self-capacitance $C_{sp}$. The deflector coil L is fed with direct current for beam-shifting purposes from a direct-current source U3 by way of a voltage-divider formed by resistors R16, R17 and potentiometer P and a choke Dr. The transistors used in the circuit all receive their operating potential from a direct-current source V.

The basic mode of operation of the circuit is as follows: Negative drive pulses applied to the input terminal are applied across a terminating resistor R34 to a coupling capacitor C18 through which the drive pulses pass to the base of a sawtooth generator transistor $T_1$. The pulses appearing at the base of transistor $T_1$ are D.C. restored by means of resistor R33 and diode Do. An appropriate bias on the base of transistor $T_1$ is ensured by means of a resistor R31 in its emitter lead, which is bypassed at signal frequencies by a capacitor C16, and a Zener diode Zo connected to the emitter from the negative supply line. The sawtooth voltage is developed across a capacitor C17, which is charged from the supply line by way of a resistor R32 and is discharged through the transistor $T_1$ when the latter becomes conductive during the drive impulses. Capacitor C17 is connected between the emitter and collector of transistor $T_1$. The potential appearing at the collector of transistor $T_1$ is applied directly to the base of transistor $T_2$, which is an emitter-follower buffer stage and provides an output signal across resistor R30 in its emitter lead. This signal is fed through a capacitor C15 to the base of preamplifier transistor $T_3$, the appropriate bias conditions for this electrode being ensured by means of resistors R29 and R35 which are connected between the base of transistor $T_3$ and the positive and negative terminals, respectively, of the supply. Linearizing negative feedback is introduced by a resistor R26 in the emitter lead of transistor $T_3$, while the output signal is taken across the collector load resistors R27 and R28, of which the latter may be adjusted to control the amplitude of the output signal. The signal appearing at the collector of transistor $T_3$ is fed through a coupling capacitor C14 to the base of a driver amplifier transistor $T_4$, which is held at the appropriate bias potential by means of resistors R24 and R25 connected between this electrode and the positive and negative terminals, respectively, of the supply. Linearizing negative feedback is introduced by a resistor R2 in the emitter lead and the output signal is taken from the collector across the load resistor R23 through capacitor C13 to the base of emitter-follower buffer transistor $T_5$. The base of transistor $T_5$ is held at an appropriate potential by means of resistors R21 and R22 connected between that electrode and the positive and negative terminals, respectively, of the supply. The output from transistor $T_5$, taken across emitter load resistor R18 is applied through capacitor C12 to the base of output transistor $T_6$. An appropriate potential at the base of transistor $T_6$ is ensured by resistor R3 connected between the base and the positive terminal of the supply and by resistors R19, R20 connected in series between the base and the negative supply terminal. When the circuit illustrated by FIG. 5 is used to develop substantial deflection powers, the heating of the transistors may lead to a shift of the working point, which could result in distortion of the deflection current. To avoid this difficulty there is connected in parallel with resistor R3 a temperature-dependent resistor R13, which is in close thermal contact with the highly thermally-conductive envelope E of transistor $T_6$, as indicated by broken lines. The operation of output transistor $T_6$ is linearized by a resistor R14 in the emitter lead and the output voltage is developed across a load inductance Ar connected in the collector lead, the signal voltage appearing thereacross being fed through capacitor C11 to the load formed by deflector coil L with its shunt capacitance $C_{sp}$. A resistor R6 connected in series with the load provides a means of monitoring the waveform of the generated current.

In order to ensure, in accordance with the present invention, that the internal resistance of the generator circuit shall be appropriate to both the trace and the flyback or retrace strokes, there are provided both a positive and also a negative feedback path. The positive feedback path is from the emitter of the output stage transistor $T_6$ by way of a resistor R1 to the emitter electrode of the driver stage transistor $T_4$, which electrode is connected to ground by way of resistor R2. By way of this feedback path there is applied to the driver stage a voltage U proportional to the output current, which is in approximately the same phase as the variation in voltage at the emitter of transistor $T_4$. The positive feedback applied at this point may alternatively be taken from other points of the output circuit, for example from the resistance R6 connected in series with the deflection coils or, if an output transformer should be employed, from a special feedback winding upon this transformer. There is thus attained a reduction in the effective internal resistance of the generator as seen by the deflection coils. If there is now introduced into the positive feedback path between $T_6$ and $T_4$ a switch operated during the flyback periods to counteract the feedback and to cause the feedback to become inoperative, then during these periods the internal resistance of the generator will rise. If the magnitude of the feedback voltage is:

$$u=\alpha.U \tag{5}$$

then the effective slope during the trace stroke is:

$$S_1=\frac{S}{1-\alpha\cdot S} \tag{6}$$

and thus $$Ri_1=R_i.(1-\alpha\cdot S) \tag{7}$$

It is necessary to ensure that $\alpha$ does not become too large, in fact the circuit becomes unstable if the value of $-\alpha\cdot S$ becomes greater than unity, and in such a case $R_i$ becomes negative. It is possible, however, safely to make $\alpha$ so large that an adequately aperiodic condition is obtained in the system during the period of the trace stroke. In practice $R_i$ is then so large during the flyback that the flyback process can take place within the available time of 5 $\mu$s.

The positive feedback, however, is accompanied by an increase in the non-linear distortion produced in the generator. This may be compensated if a corresponding amount of negative feedback is provided from the output of the generator to a point beyond that at which the positive feedback is introduced. In the circuit of FIG. 5, negative feedback is applied from the emitter of transistor $T_6$ to that of the preamplifier transistor $T_3$ by way of two series-connected resistors R4 and R5. The total distortions are thus largely balanced out in this preamplifier stage. This negative feedback does of course increase the generator resistance again, but this can be taken into account in the design of the negative and positive feedback paths so that the appropriate internal resistance is still obtained in the circuit. The output transistor $T_6$, which may be of Type 2N1906 has, even without positive feedback, an internal resistance so low that Equation 4 could not be fulfilled without the use of negative feedback.

To produce a rectilinearly changing current through the deflector coils, use may be made of the fact that the sawtooth voltage developed by the sawtooth generator $T_1$ follows an exponential function (unless the circuit illustrated is replaced by some more complex arrangement) and that in addition the current through the deflection coils likewise follows an exponential function, the time-constant T of which is equal to $L/R_i$. Although only the substantially linear part of the current variation is made use of, even the non-linearities contained in this portion cause distortion. If it is desired to obtain a completely rectilinear variation with time of the deflection-coil current $i_L$—and herein lies an advantage of this circuit arrangement as compared with a conventional scan generator using diode switches—then the control signal must be correspondingly predistorted. This may be effected by the use of a third feedback circuit from the output of the scan generator. For this purpose there is provided in the circuit arrangement shown in FIG. 5 a negative-feedback path, extending from the point $e$ at the output of the scan generator to the point $a$ at the output of the sawtooth voltage wave generator formed by the transistor $T_1$, which path contains in series a fixed resistor R7 and adjustable resistor R8 and a capacitor C9. A function of the output current is thus added in antiphase to the same function of the control signal. The current through the deflection coils thus becomes a linear function of time when the sum of these functions is zero. This may be arranged by adjusting the amount of feedback by means of the adjustable resistor R8.

A further possibility of suppressing the harmonic oscillations consists in applying positive feedback to an intermediate common electrode, in particular to the emitter of the driver stage, which is connected to ground by way of a negative feedback resistor R2, which in turn is shunted by a capacitor C10 of such a value that the negative feedback effective during the trace stroke is substantially reduced, and preferably becomes substantially ineffective, for the brief impulses applied by way of the positive feedback resistor R1 during the flyback periods.

To reduce or suppress the positive feedback during the flyback periods there may also be connected with resistor R1 in the positive feedback path a further resistor R11 and a switch S12, which in practice may take the form of a pulse-driven diode clamp circuit. As shown in FIG. 7, switch 12 is connected between the junction point of resistors R1 and R11 and a point of substantially constant potential, such as ground, and with a source of control pulses coinciding with the flyback periods.

The operation of the circuit will now be further described with reference to oscillograms $a$ to $g$ (FIG. 6). The transistor $T_1$ operates merely as a switch, thus generating at the point $a$ an almost linear sawtooth voltage. Oscillogram $b$ shows the control signal developed by the voltage wave generator, to which has been added a negative feedback voltage proportional to the output current. Waveform $c$ illustrates the control signal after the addition of the positive feedback voltage in the unloaded condition and waveform $d$ shows the same signal loaded by the input signal to the output stage. Oscillogram $e$ shows the variation with time of the voltage developed at the emitter of transistor $T_6$. Oscillogram $f$ shows the voltage applied to the driven end of the deflector coil system. The relation between the trace stroke and the flyback may be seen, and also the absence of transient distortion. The current waveform oscillogram $g$ is obtained from the voltage appearing across a resistor R6 of low value which is connected in series within the deflector coil system. It will be observed that here also there is no transient distortion.

The circuit arrangement above described has already been found to be valuable in practice, and makes possible the production of a very short flyback time, so that the time remaining before the commencement of the picture may be made use of for precorrection of tangential errors and the like.

The values of the components used in the circuit arrangement shown in FIG. 5 are listed below:

Resistors:

| | |
|---|---|
| R1 | 3.5 kilohms. |
| R2 | 390 ohms. |
| R3 | 15 kilohms. |
| R4 | 5.6 kilohms. |
| R5 | 390 ohms. |
| R6 | 1 ohm. |
| R7 | 50 kilohms. |
| R8 | 50 ohms. |
| R11 | 3 kilohms. |
| R13 | NTC 4 kilohms. |
| R14 | 6.5 ohms. |
| R16 | 2 kilohms. |
| R18 | 100 ohms. |
| R19 | 2.7 kilohms. |
| R20 | 560 ohms (adjustable). |
| R21 | 4.7 kilohms. |
| R22 | 8.2 kilohms. |

Resistors—Continued

| | |
|---|---|
| R23 | 2.2 kilohms. |
| R24 | 5 kilohms. |
| R25 | 39 kilohms. |
| R26 | 680 ohms. |
| R27 | 1.5 kilohms. |
| R28 | 500 ohms. |
| R29 | 5 kilohms. |
| R30 | 3.3 kilohms. |
| R31 | 820 ohms. |
| R32 | 82 kilohms. |
| R33 | 1 kilohm. |
| R34 | 75 ohms. |
| R35 | 39 kilohms. |

Transistors:

| | |
|---|---|
| T1 | Type 2N118. |
| T2 | Type 2N118. |
| T3 | Type 2N118. |
| T4 | Type 2N118. |
| T5 | Type 2N1906. |
| T6 | Type 2N1906. |

| Capacitors: | μf. |
|---|---|
| Cp | 0.05 |
| C10 | 0.005 |
| C11 | 25 |
| C12 | 2 |
| C13 | 1 |
| C14 | 1 |
| C15 | 1 |
| C16 | 0.5 |
| C17 | 0.01 |
| C18 | 0.001 |

| Chokes: | mh. |
|---|---|
| Dr | 60 |
| Ar | 60 |
| L | 0.4 |

Diodes:

| | |
|---|---|
| Zo | Type 10M10Z. |
| Do | Type 1N56A. |

Potentiometer:

| | |
|---|---|
| P | 5 kilohms. |

It will be understood that each of the elements described above, or two or more together, may also find a useful application in other types of sawtooth voltage generator arrangement differing from the types described above.

While the invention has been illustrated and described as embodied in sawtooth scan voltage generator arrangement for controlling a television deflection system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A transistor horizontal scan generator for supplying control voltages to a television deflector system to control the horizontal trace and retrace beam movements, comprising, in combination, a sawtooth voltage generator; at least one preamplifier means for amplifying the output of said sawtooth voltage generator; output amplifier means arranged to be supplied with an amplified voltage derived from said preamplifier means and adapted to feed a modified sawtooth control voltage having in every wave an ascending slope period and a descending slope period to the television deflector system; and means for applying a positive feedback voltage from said output amplifier means to a point between said output amplifier means and said preamplifier means for reducing the internal resistance of said output amplifier means and for reducing said positive feedback voltage only during said descending slope period so as to effect during said period an increase of the internal resistance of said output amplifier means, whereby the duration of said descending slope period in said modified sawtooth voltage and thereby the retrace time are reduced.

2. A transistor horizontal scan generator for supplying control voltages to a television deflector coil system to control the horizontal race and retrace beam movements, comprising, in combination, a sawtooth voltage generator; at least one preamplifier transistor means for amplifying the output of said sawtooth voltage generator; class A output amplifier transistor means arranged to be supplied with an amplified voltage derived from said preamplifier means and adapted to feed a modified sawtooth control voltage having in every wave an ascending slope period and a descending slope period, to the television deflector coil system; positive feedback means for applying a feedback voltage from said output amplifier means to a point between the latter and said preamplifier means for thereby reducing the inner resistance of said output amplifier means; and control means being operative only during said descending slope periods of said sawtooth voltage and suppressing, when operative, the feedback voltage of said positive feedback means, thereby permitting an increase of said inner resistance of said output amplifier means during said descending slope periods to a value higher than that existing during said ascending slope periods, whereby the duration of said descending slope periods in said modified sawtooth voltage and thereby the retrace time are reduced.

3. The apparatus claimed in claim 2, wherein said output transistor amplifier means includes a base electrode, an emitter electrode and a collector electrode, and including resistor means connected with said emitter electrode for developing across said resistor means said positive feedback voltage.

4. The apparatus claimed in claim 2, wherein a resistor means is connected in series with deflector coil system for developing across said resistor said positive feedback voltage.

5. The apparatus claimed in claim 2, wherein first choke means are connected between a source of direct current and the output electrode of said output amplifier transistor means, capacitor means being connected between the junction point located between said first choke means and said output electrode, and an output terminal adapted to be connected to the television deflector coil system, and second choke means being connected between said source of direct current and said terminal.

6. A transistor horizontal scan generator for supplying control voltages to a television deflector coil system to control the horizontal trace and retrace beam movements, comprising, in combination, a sawtooth voltage generator; at least one preamplifier transistor means for amplifying the output of said sawtooth voltage generator; class A output amplifier transistor means arranged to be supplied with an amplified voltage derived from said preamplifier means and adapted to feed a modified sawtooth control voltage having in every wave an ascending slope period and a descending slope period, to the television deflector coil system; positive feedback means for applying a feedback voltage from said output amplifier means to a point between the latter and said preamplifier means for thereby reducing the inner resistance of said output amplifier means, said feedback means comprising two resistor means connected at a junction point with each other; and control means being operative only during said descending slope periods of said sawtooth voltage and including switching means for periodically and intermittently connecting said junction point between said resistors with a point of constant potential, said switching means suppressing, when in conductive condition, the feedback voltage of said positive feedback means, thereby permitting an increase of said inner resistance of said output amplifier means during said descending slope periods to a value higher than that existing during said ascending slope periods, whereby the duration of said descending slope periods in said modified sawtooth voltage and thereby the retrace time are reduced.

7. The apparatus claimed in claim 6, wherein said switching means include gate means changeable between conductive and non-conductive condition under the control of impulses; and a source of control impulses connected with said gate means for supplying to the same control impulses coinciding with said descending slope periods.

8. A transistor horizontal scan generator for supplying control voltages to a television deflector coil system to control the horizontal trace and retrace beam movements, comprising, in combination, a sawtooth voltage generator; at least one preamplifier transistor means having an input electrode, an output electrode and a common electrode for amplifying the output of said sawtooth voltage generator; class A output amplifier transistor means arranged to be supplied with an amplified voltage derived from said preamplifier means and adapted to feed a modified sawtooth control voltage having in every wave an ascending slope period and a descending slope period, to the television deflector coil system; positive feedback means for applying a feedback voltage from said output amplifier means to said common electrode of said preamplifier means, said feedback means comprising a resistor means connected to said common electrode of said preamplifier transistor means; and capacitor means connected in parallel with said resistor means, said capacitor means having such a value that during said descending slope periods said feedback voltage is substantially suppressed, thereby permitting an increase of the inner resistance of said output amplifier means during said descending slope periods to a value higher than that existing during said ascending slope periods, whereby the duration of said descending slope periods in said modified sawtooth voltage and thereby the retrace time are reduced.

9. The apparatus claimed in claim 8, wherein said feedback means further comprise two series-connected resistor means between said output amplifier means and said common electrode of said preamplifier means, said resistor means having a junction point, and wherein switching means are provided for periodically and intermittently connecting said junction point between said series-connected resistors with a point of constant potential, said switching means suppressing, when in conductive condition, the feedback of said feedback means, thereby contributing to an increase of said inner resistance of said output amplifier means during said descending slope periods.

10. The apparatus claimed in claim 9, wherein said switching means include gate means changeable between conductive and non-conductive condition under the control of impulses; and a source of control impulses connected with said gate means for supplying to the same control impulses coinciding with said descending slope periods.

11. The apparatus claimed in claim 8, wherein said output transistor amplifier means includes a base electrode, an emitter electrode and a collector electrode, and including resistor means connected with said emitter electrode for developing across said resistor means said positive feedback voltage.

12. The apparatus claimed in claim 8, wherein a resistor means is connected in series with said deflector coil system for developing across said resistor said positive feedback voltage.

13. A transistor horizontal scan generator for supplying control voltages to a television deflector coil system to control the horizontal trace and retrace beam movements, comprising, in combination, a sawtooth voltage generator; at least two connected preamplifier transistor means for amplifying the output of said sawtooth voltage generator; class A output amplifier transistor means arranged to be supplied with an amplified voltage derived from said preamplifier means and adapted to feed a modified sawtooth voltage having in every wave an ascending slope period and a descending slope period, to the television deflector coil system; first and second positive feedback means for applying a first positive feedback voltage from said output amplifier means to the first one of said preamplifier means and for applying a second negative feedback voltage to the second one of said preamplifier means, respectively, said first positive feedback voltage reducing the inner resistance of said output amplifier means, and said second negative feedback voltage serving to compensate for distortions that may be caused by the application of said first positive feedback voltage; and control means being operative only during said descending slope periods of said sawtooth voltage and suppressing, when operative, said first positive feedback voltage, thereby permitting an increase of said inner resistance of said output amplifier means during said descending slope periods to a value higher than that existing during said ascending slope periods, whereby the duration of said descending slope periods in said modified sawtooth voltage and thereby the retrace time are reduced.

14. A transistor horizontal scan generator for supplying control voltages to a television deflector coil system to control the horizontal trace and retrace beam movements, comprising, in combination, a sawtooth voltage generator comprising a capacitor and a resistor connected with said capacitor, and means for charging said capacitor and for producing during such charging the ascending slope period of a sawtooth voltage wave, and means including a transistor for discharging said capacitor across said transistor for producing during such discharge the descending slope period of said sawtooth wave, and means for rendering said transistor conductive during said descending slope period; at least one preamplifier transistor means for amplifying the output of said sawtooth voltage generator; class A output amplifier transistor means arranged to be supplied with amplified voltage derived from said preamplifier means and adapted to feed a modified sawtooth control voltage having in every wave an ascending slope period and a descending slope period, to the television deflection coil system; means connected between said capacitor and the deflector coil system for applying to said capacitor a negative feedback voltage proportional to the current flow through said deflector coil system on account of said modified sawtooth control voltage feed thereto and for combining said negative feedback voltage with the voltage appearing across said capacitor; positive feedback means connected between said output amplifier means and a point between the latter and said preamplifier means for applying a positive feedback voltage from said output amplifier means to said point and for applying a positive feedback voltage from said output amplifier means to said junction point and for thereby reducing the inner resistance of said output amplifier means; and control means connected with said feedback means and being operative only during said descending slope periods of said sawtooth voltage and suppressing, when operative, the effect of said positive feedback means, thereby permitting an increase of said inner resistance of said output amplifier means during said descending slope periods to a value higher than that existing during said ascending slope periods, whereby the duration of said descending slope periods in said modified sawtooth voltage and thereby the retrace time are reduced.

15. A transistor horizontal scan generator for supplying control voltages to a television deflector coil system to control the horizontal trace and retrace beam movements, comprising, in combination, a sawtooth voltage generator comprising a capacitor and a resistor connected with said capacitor, and means for charging said capacitor and for producing during such charging the ascending slope period of a sawtooth voltage wave, and means including a transistor for discharging said capacitor across said transistor for producing during such discharge the descending slope period of said sawtooth wave, and means for rendering said transistor conductive during said descending slope period; at least one preamplifier transistor means for amplifying the output of said sawtooth voltage generator; class A output amplifier transistor means arranged to be supplied with an amplified voltage derived from said preamplified means and adapted to feed a modified sawtooth control voltage having in every wave an ascending slope period and a descending slope period, to the television deflection coil system; positive feedback means for applying a positive feedback voltage from said output amplifier means to a point between the latter and said preamplifier means for thereby reducing the inner resistance of said output amplifier means; control means connected with said feedback means and being operative only during said descending slope periods of said sawtooth voltage and suppressing, when operative, the feedback voltage of said positive feedback means, thereby permitting an increase of said inner resistance of said output amplifier means during said descending slope periods to a value higher than that existing during said ascending slope periods, whereby the duration of said descending slope periods in said modified sawtooth voltage and thereby the retrace time are reduced; and negative feedback means connecting siad capacitor with a voltage source proportional to the amplitude of a current flowing through said deflector coil system on account of said modified sawtooth control voltage fed thereto.

16. A method of shortening, in a generator system having at least two connected preamplifier stages and an output amplifier stage for producing a sawtooth voltage having in each wave an ascending slope period and a descending slope period, the duration of the latter, comprising the steps of applying from said output amplifier stage a positive feedback voltage to a point between the latter and the second preamplifier stage only during said descending slope periods, and of applying a negative feedback voltage from said output amplifier stage to the first preamplifier stage for compensating for distortions that may be caused by said positive feedback voltage.

References Cited by the Examiner

UNITED STATES PATENTS

| | | | |
|---|---|---|---|
| 2,562,941 | 8/51 | Parker | 315—27 X |
| 2,602,896 | 7/52 | Whitaker | 331—105 X |
| 2,841,744 | 7/58 | Chass | 315—27 |
| 2,913,625 | 11/59 | Finkelstein | 315—27 |

OTHER REFERENCES

IRE Dictionary of Electronics Terms and Symbols, Institute of Radio Engineers, New York, 1961, pp. 96, 130.

DAVID G. REDINBAUGH, *Primary Examiner.*

RALPH G. NILSON, *Examiner.*